United States Patent [19]

Nichols

[11] 4,276,948
[45] Jul. 7, 1981

[54] MICROWAVE OVEN COOKING TIME SCALE

[76] Inventor: Donald H. Nichols, 4324 IDS Center, Minneapolis, Minn. 55402

[21] Appl. No.: 4,297

[22] Filed: Jan. 18, 1979

[51] Int. Cl.³ .................... G01G 23/22; G01G 19/00
[52] U.S. Cl. ...................................... 177/44; 177/245
[58] Field of Search ................... 177/41, 42, 44, 245

[56] References Cited

U.S. PATENT DOCUMENTS

| | | | |
|---|---|---|---|
| 118,862 | 9/1871 | Kirkwood | 177/44 |
| 1,258,041 | 3/1918 | Perry | 177/44 |
| 1,285,447 | 11/1918 | Spinello | 177/42 |
| 3,516,505 | 6/1970 | Montoya | 177/44 |
| 4,223,750 | 9/1980 | Perego | 177/245 X |

Primary Examiner—George H. Miller, Jr.
Attorney, Agent, or Firm—Hugh D. Jaeger

[57] ABSTRACT

A microwave oven cooking time scale for predetermining cooking time for a known amount of food to reach a predetermined temperature for a predetermined heating efficiency of the food in a microwave oven. The microwave oven cooking time scale includes a balance beam scale with food positioned at a fixed point on one side of the balance beam and a counterweight adjustable along the length of a cylindrical information chart rotatably engaged on the balance beam. The counterweight includes a pointer which indicates on the rotatable cylindrical informational chart the proper cooking time to reach a predetermined particular temperature. The cylindrical information chart is divided as a function of time and temperature on an x-y axis and can be subdivided as a function of cooking efficiency, cooking power, and cooking moisture on the y axis. The cylindrical information cylinder is replaceable for different models or manufacturers of microwave ovens. The cylindrical information chart can also compensate for the weight of the cooking container.

3 Claims, 3 Drawing Figures

U.S. Patent
Jul. 7, 1981
4,276,948
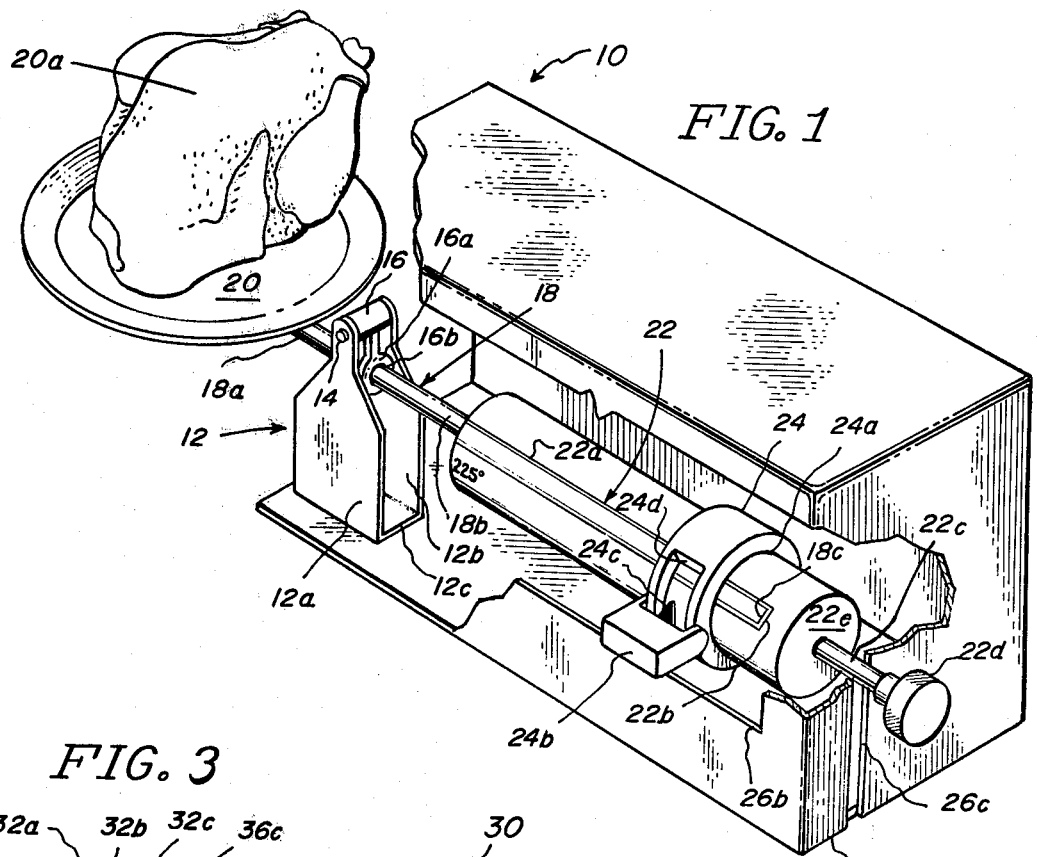
FIG. 1
FIG. 3
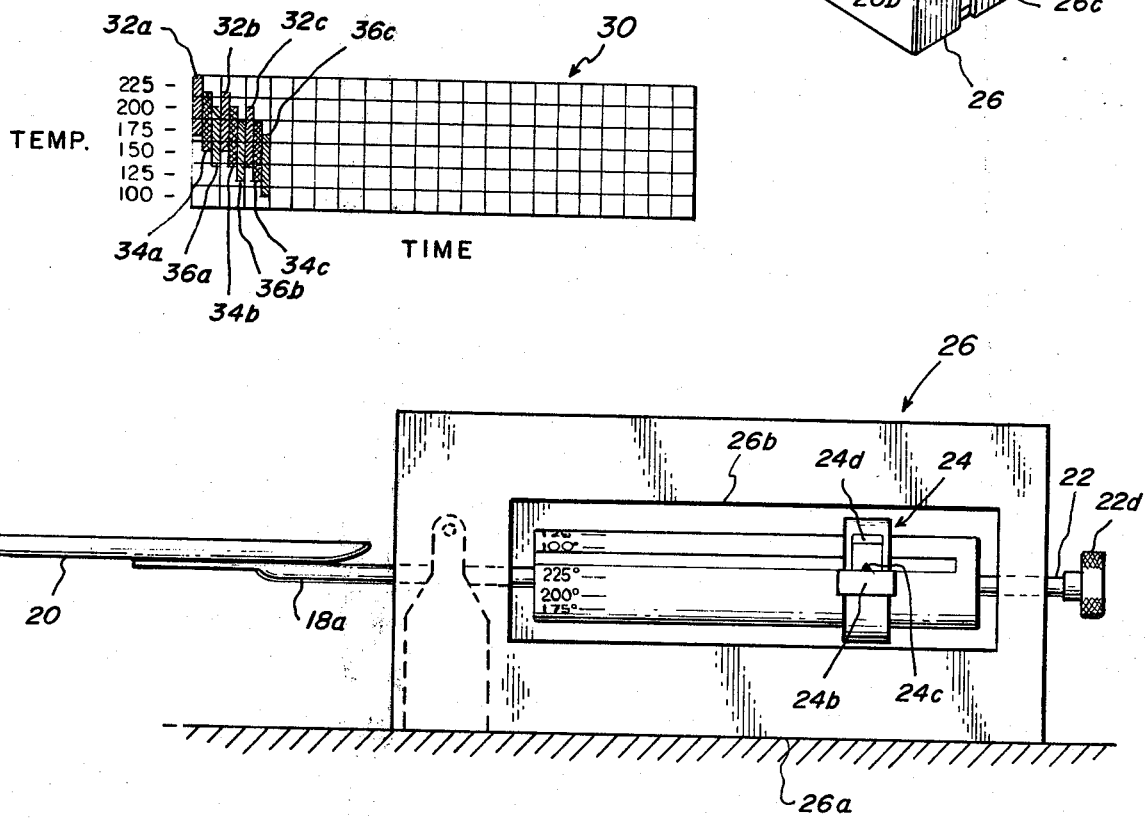
FIG. 2

MICROWAVE OVEN COOKING TIME SCALE

BACKGROUND OF THE INVENTION

1. Field of the Invention

The present invention relates generally to heating with electromagnetic wave energy in a conductive cavity, and more particularly, pertains to a microwave oven cooking time scale for use with a microwave oven.

2. Description of the Prior Art

Those concerned with microwave ovens have long recognized the need for a microwave oven cooking time scale which permits a user to determine the cooking time for a particular type of food at a particular temperature for a microwave oven. The present invention fullfills this need.

In the past, cooking time determination for a particular type of food has been made by reviewing of one of the numerous microwave oven cookbooks presently available in the market or furnished with a user's microwave oven to correlate the weight of a particular type of food to a cooking time. While this program of determination has been somewhat satisfactory, the program of determination of cooking time has been less than accurate and sometimes resulted in food which was either undercooked or overcooked. Some cookbooks also failed to take into account particular cooking factors such as heating efficiencies of the food, moisture content of the food, and power output of the microwave oven.

Recently, a platform scale has been offered at the market which operates with microwave ovens in the six to seven hundred watt range, and determines the cooking time and power setting to use based on the food category and quantity of food to be cooked. The platform scale is not an accurate process of weighing compared to a balance beam scale and in addition, the particular scale does not take into account the cooking factors such as heating efficiency of the food and moisture content of the food.

The microwave oven cooking time scale overcomes the shortcomings of the prior art by providing a scale which permits accurate determination of cooking times for food in a microwave oven and also takes into account secondary cooking factors.

SUMMARY OF THE INVENTION

The general purpose of this invention is to provide a microwave oven cooking time scale to predetermine the cooking time for a particular piece of food as a function of the temperature of cooking of the food.

According to one embodiment of the present invention, there is provided a microwave oven cooking time scale including a fulcrum point, a balance beam axially supported on the fulcrum point, a food support member on the left side of the balance beam, a rotatably engaged cylindrical information chart on the right side of the balance beam and including a plurality of x axis divisions for time and a plurality of y axis divisions for temperature, and a slidable counterweight frictionally engaged on the cylinder whereby the food product is positioned on the left hand side of the balance beam and the counterweight is respectively moved longitudinally on the cylinder on the right side of the balance beam to a position where the balance beam is balanced at the fulcrum of the scale thereby corresponding to a cooking time in minutes for a particular predetermined temperature of cooking.

One significant aspect and feature of the present invention is to provide a microwave oven cooking time scale which determines the cooking time in minutes of a food for a particular predetermined temperature and can also account for the cooking efficiency of the food, the moisture content of the food, and other cooking factors as may be deemed necessary.

Having briefly described one preferred embodiment, it is a principal object of the present invention to provide a microwave oven cooking time scale.

An object of the present invention is to provide a microwave oven cooking time scale having a rotatable cylindrical information chart frictionally engaged on the balance beam of the scale with printed cooking information relating the cooking time to the cooking temperature of the food. While the cylindrical information chart corresponds to cooking time to cooking temperature, the cylindrical information chart can also correspond secondary cooking factors such as power of the microwave oven, moisture content of the food, and cooking efficiency of the food to the cooking time.

Another object of the present invention is to provide a microwave oven cooking time scale having a replaceable cylindrical information chart which can be easily replaced by the user and can correspond to different models or manufacture of microwave ovens.

A further object of the present invention is to provide a microwave oven cooking time scale which provides a cylindrical information chart which has a plurality of columns subdivided into sub-columns having secondary cooking factors such as the cooking efficiency of the food, the moisture content of the food, and the power factor of the microwave oven relating to the cooking temperature and cooking time.

An additional object of the present invention is to provide a microwave oven cooking time scale which compensates for the weight of the container in which the food product is contained and weighed. This is accomplished by either utilizing a second counterweight or by predetermination of the cylindrical information chart to take into account the weight for a particular container, cooking or otherwise, and for a particular model of manufacture of microwave ovens.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 illustrates a perspective view of a microwave oven cooking time scale;

FIG. 2 illustrates a front view of the microwave oven cooking time scale, and;

FIG. 3 illustrates another embodiment of a planar view of a cylindrical information chart for the microwave oven cooking time scale of FIGS. 1 and 2.

DESCRIPTION OF A PREFERRED EMBODIMENT

FIG. 1, which illustrates a perspective view of a microwave oven cooking time scale 10 of the present invention, shows a fulcrum 12 including opposing rectangular sides 12a and 12b spaced apart and affixed by a pivot pin 14, and a horizontal support 12c affixed between sides 12a and 12b to a base 26a of a housing 26 as later described in detail. A cylindrical member 16 having an inner diameter slightly larger than the outer diameter of the pivot pin 14 axially rotates about the longitudinal axis of the pivot pin 14. A downwardly extending perpendicular member 16a having a hole 16b orthogonal to the longitudinal axis of the pivot pin 14 affixes to the midpoint of the cylindrical member 16. A balance beam 18 frictionally engages within the hole 16b of the member 16a and extends beyond the sides of the fulcrum 12. The left side 18a of the balance beam 18 supports at one end a container 20 having a food product 20a, and the right side 18b of the balance beam 18 extends outwardly for a finite distance to an end 18c. A cylindrical information chart 22 having an internal diameter 22a slightly larger than the outer diameter of the balance beam 18 and partially extending through the cylinder 22 slides over and is frictionally engaged to the right side 18b of the balance beam 18. An inner end 22b of the internal diameter 22a abuts up and engages against the end 18c of the balance beam 18. A longitudinal rod 22c having a knurled knob 22d extends outwardly from an outer end 22e of the cylindrical informational cylinder. A cylindrical counterweight 24 having an inner diameter 24a slightly larger than the outer diameter of the cylindrical information chart 22 loosely and frictionally slidably engages over the cylindrical information chart 22. An outwardly extending longitudinally grooved knob 24b affixes to the cylindrical counterweight 24 and protrudes through a horizontal longitudinal window 26b in the housing 26. An upwardly extending vertical pointer 24c affixes onto the counterweight 24. A transparent window 24d positions above the pointer 24c in the counterweight 24. A housing 26 including the vertically upward extending slot 26c and the horizontal longitudinal window 26b surrounds the inner portions of the scale 10.

FIG. 2, illustrates a front view of the microwave oven cooking time scale 10 where all elements correspond to those previously described.

FIG. 3, which illustrates another embodiment of a planar view of a cylindrical information chart 30 for the microwave oven cooking time scale 10 of FIGS. 1 and 2, shows the chart 30 subdivided for different cooking efficiencies of food such as low efficiency 32a, medium efficiency 32b, and high efficiency 32c, corresponding to different temperatures for each distinct period of time. For a longer period of cooking time, the efficiency can vary for different temperatures as illustrated by the subdivisions 32a, 32b, and 32c respectively. Subdivisions 34a, 34b, and 34c correspond to low, medium, and high moisture content of food and subdivisions 36a, 36b, and 36c correspond to low, medium, and high power outputs of a microwave oven. The subdivisions 32, 34, and 36 can either be positioned singularly or in a plurality adjacent to other subdivisions.

Preferred Mode of Operation

Referring to FIGS. 1 and 2, the food product 20a such as a turkey as illustrated in FIG. 1 by way of example and for purposes of illustration only is positioned on a container 20 which is suitably positioned on the left side 18a of the balance beam 18. Subsequently, the counterweight 24 is appropriately positioned on the cylindrical information chart 22 at the point where the chart 22 is centered and viewable through the housing window 26b. When this balanced condition is achieved, the cooking time in minutes can be read for the predetermined temperatures from the scale as illustrated in FIG. 1. For reasons of the natural process of cooking, the longer the cooking time, the lower the temperature.

Depending upon the particular model or manufacturer of microwave oven utilized by an individual or the particular type of foods being cooked, the cylindrical information chart 22 is easily and readily replaceable. The cylindrical information chart 22 can also be replaceable for the same models of microwave oven depending upon the different types of food being cooked, different efficiencies of food being cooked, different moisture contents of food being cooked, etc.

The weight of the container 20 can be counterbalanced in the microwave oven cooking time scale 10 by the weight of the cylindrical information chart 22. In the alternative, a second counterweight not illustrated can be positioned on the right side 18b of the balance beam 18 to compensate for the weight of the container 20.

FIG. 3 illustrates the expanded planar view of the cylindrical information chart which has been appropriately subdivided into cooking efficiency subcolumns of low efficiency, medium efficiency, or high efficiency foods. Accordingly, the chart 30 is positioned around a cylinder thereby forming the cylindrical information chart 22 and is suitably affixed thereto with adhesive. The operation is identical to that of FIGS. 1 and 2.

Various modifications can be made to the microwave oven cooking time scale without departing from the apparent scope of the invention.

Having thus described the invention, what is claimed is:

1. Microwave oven cooking time scale for determining the length of time to cook a particular piece of food as a function of a predetermined temperature comprising:
   a. balance beam scale means including a fulcrum support means, a fulcrum point positioned on said fulcrum support means, a cylindrical means supported on said fulcrum point and including a downwardly extending pivot means and balance beam means extending longitudinally and at right angles from both sides of said pivot means;
   b. food container means positioned on one side of said balance beam means for weighing food on said scale;
   c. cylindrical information microwave chart means rotatably engaged over the other end of said balance beam means and being of a weight to substantially equal and compensate for said food container means in which said food is weighed and including longitudinally extending rod including a knurled knob at one end, and an informational chart columnly divided as a function of temperature and time and subdivided into at least one subdivision column for cooking efficiencies of food, each subdivision corresponding to low efficiency, medium efficiency, and high efficiency of food for microwave cooking;
   d. counterweight means including a cylindrical member engaged over said chart means and including a transparent window, a knob extending horizontally outward, and pointer extending vertically upward and encompassing a portion of said transparent window; and,
   e. housing means covering said scale including a rectangular configuration having a horizontal rectangular window substantially corresponding to the diameter and length respectively of said cylindrical information chart means and a substantially upward extending rectangular vertical slot to accommodate said longitudinal rod extending from said chart means whereby said food is placed on said container means and said counterweight means is respectively adjusted to substantially align said information cylinder means with said horizontal window means thereby indicating the temperature, time and efficiency of the food microwave cooking conditions.

2. The microwave oven cooking time scale of claim 1 wherein said cylindrical information chart is subdivided as a function of low, medium, or high moisture contents of said food for microwave cooking.

3. The microwave oven cooking time scale of claim 1 wherein said cylindrical information chart is subdivided as a function of particular types of food for microwave cooking.

* * * * *